United States Patent Office 3,780,035
Patented Dec. 18, 1973

3,780,035
PHENOTHIAZINE AND DIBENZOCYCLO-
HEPTANE DERIVATIVES
Michio Nakanishi, Oita, Takanori Oe, Fukuoka, and Toshio Seki, Oita, Japan, assignors to Yoshitomi Pharmaceutical Ind., Ltd., Osaka, Japan
No Drawing. Filed Apr. 10, 1972, Ser. No. 242,769
Claims priority, application Japan, Apr. 10, 1971, 46/22,550
Int. Cl. C07d 93/14
U.S. Cl. 260—243 A                              10 Claims

ABSTRACT OF THE DISCLOSURE

N,N-disubstituted piperazine compounds of the formula

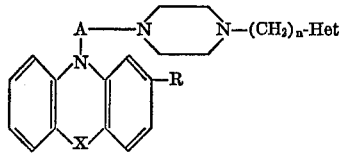

wherein X is —S—, —$CH_2$—$CH_2$— or —CH=CH—, R is H, $C_{1-4}$ alkyl, methoxy, methylthio, acetyl, trifluoromethyl or halogen, A is $C_{2-4}$ alkylene, n is 0, 1, 2 or 3 and Het represents furyl, pyridyl or thienyl, and pharmaceutically acceptable acid addition salts thereof are useful as psychotropic agents.

---

This invention relates to novel and therapeutically valuable N,N-disubstituted piperazine compounds of the formula

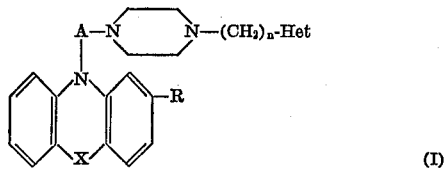

(I)

wherein X is —S—, —$CH_2$—$CH_2$— or —CH=CH—, R is H, $C_{1-4}$ alkyl (e.g. methyl, ethyl, propyl, isopropyl or butyl), methoxy, methylthio, acetyl, trifluoromethyl or halogen (F, Cl or Br), A is $C_{2-4}$ alkylene (e.g. ethylene, propylene, trimethylene, tetramethylene or 2-methyltrimethylene), n is 0, 1, 2 or 3 and Het represents furyl, pyridyl or thienyl, and pharmaceutically acceptable acid addition salts thereof.

The compounds of Formula I are produced by the following methods:

(i) By reaction of a compound of the formula

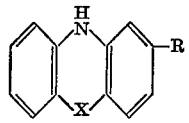

(II)

with a compound of the formula

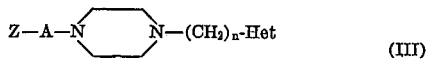

(III)

wherein Z is a reactive atom or radical such as halogen (Cl, Br or I), methylsulfonyloxy, phenylsulfonyloxy or p-tolylsulfonyloxy.

(ii) By reaction of a compound of the formula

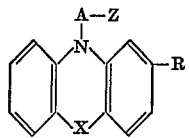

(IV)

wherein Z is defined as above, with a compound of the formula

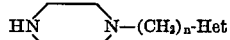

(V)

(iii) By reaction of compound of the formula

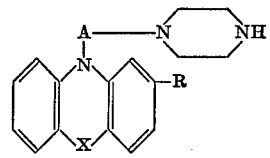

(VI)

with a compound of the formula

Z—$(CH_2)_n$H-et                              (VII)

wherein Z is defined as above.

These reactions are advantageously carried out in a solvent preferably at a temperature near the boiling point of the solvent for several to ten-odd hours. The said solvent may be selected from the group consisting of methanol, ethanol, propanol, isopropyl alcohol, butanol, acetone, methylethylketone, methylbutylketone, cyclohexane, benzene, toluene, xylene, chlorobenzene, tetrahydrofuran, dioxane, diethyl ether, pyridine, dimethylformamide and liquid ammonia.

The reactions may be carried out in the presence of a deacidifying or condensing agent such as sodium hydroxide, potassium hydroxide, sodium carbonate, potassium carbonate, pyridine or triethylamine.

In method (i), it is advantageous to convert, prior to the said reaction, the starting compound of Formula II into the sodium salt by treatment, for example, with sodium amide.

In method (iii), it is advantageous to carry out the reaction in the presence of an alkali metal salt such as sodium carbonate or potassium carbonate. It is also advantageous to convert the starting compound of Formula VI into the alkali salt by treatment e.g. with dispersed sodium, sodium hydroxide, potassium hydride or sodium amide and then react the alkali salt, with or without isolation, with Compound VII.

The compounds of Formula I can be converted into acid addition salts in a conventional manner by treatment with various inorganic and organic acids, for example, hydrochloric, hydrobromic, sulfuric, oxalic, maleic, fumaric and tartaric acid.

The compounds of Formula I and pharmaceutically acceptable acid addition salts thereof are excellent in suppression of spontaneous locomoter activity, antimetrazole effect, suppression of fighting behavior and anti-mescaline effect as shown, for example, by the following tests.

(1) SUPPRESSION OF SPONTANEOUS LOCOMOTOR ACTIVITY

Suppression of spontaneous locomotor activity was measured by the Photocell method described by P. B. Dews in "British Journal of Pharmacology," vol. 8, p. 46ff. (1953). The procedure was as follows:

Each group consisting of five male mice (dd-strain mice weighing 20 to 25 g.) was kept in a compartment. Forty minutes after the intraperitoneal administration of the test compounds, the spontaneous motility was counted for 20 minutes. The $ED_{50}$ shows the dose required for 50% suppression of spontaneous motility.

(2) ANTIMETRAZOLE EFFECT

Metrazole (pentylenetetrazole) (150 mg./kg.) was administered subcutaneously to groups each consisting of 6 mice 15 minutes after the intraperitoneal administration of the test compound. The number of dead mice was counted 30 minutes after the administration of metrazole, and then the $ED_{50}$, the dose required to suppress the death rate to 50%, was determined.

(3) SUPPRESSION OF FIGHTING BEHAVIOR

Fighting episodes were produced in mice by the method described by Tedeschi et al. in Journal of Pharmacology and Experimental Therapeutics, vol. 125, p. 28ff. (1959). Groups of 8 female mice (4 pairs) were given the test compound orally 60 minutes prior to receiving electric foot-shock for 3 minutes with an interrupted direct current of 530 volts, 1.3 milliamperes, 10 cycles per second. In case 3 fighting episodes or less within 3 minutes were exhibited, the pair of mice was deemed to be suppressed by the test compound. The control mice of 81 pairs showed the fighting episodes of 8.7 times on the average under the same conditions. The $ED_{50}$, the dose required to suppress 50% of fighting pairs, was determined graphically.

(4) ANTIMESCALINE EFFECT

A modification of the method of R. A. Turner [Screening Method in Pharmacology, Edited by R. A. Turner, p. 73, Academic Press (1965)] was used to study the prevention of scratching episodes induced by mescaline. The test compounds were given to groups each of 6 female mice orally 60 minutes prior to treatment with mescaline sulfate (30 mg./kg. intraperitoneal). Ten minutes later, the effect of test compounds on the scratching episodes was observed for 10 minutes. The $ED_{50}$ shows the dose required for prevention of scratching in 50% of the animals.

RESULTS

| Compound: | Suppression of spontaneous locomotor activity $ED_{50}$ mg./kg. (intraperitoneal) |
|---|---|
| A | 0.6 |
| B | 0.2 |
| C | 24.1 |
| D | 40 |
| E | 5 |
| F | 2.2 |
| G | 4.7 |

| Compound: | Antimetrazole effect, $ED_{50}$ mg./kg. (intraperitoneal) |
|---|---|
| A | 10 |
| B | 27 |
| C | 98 |
| D | 90 |

| Compound: | Suppression of fighting behavior, $ED_{50}$ mg./kg. (oral) |
|---|---|
| A | 17 |
| B | 14 |
| C | 26 |
| D | 4.0 |
| E | 8.1 |

| Compound: | Antimescaline effect, $ED_{50}$ mg./kg. (oral) |
|---|---|
| A | 8 |
| B | 5 |
| D | 26 |
| E | 4.7 |
| F | 1.6 |
| G | 1.9 |

Compounds A to G are identified below:

(A) 1-[3-(2-methoxy-10-phenothiazinyl)propyl]-4-(3-pyridylmethyl)piperazine dimaleate
(B) 1-[3-(2-chloro-10-phenothiazinyl)propyl]-4-[2-(2-pyridyl)ethyl]piperazine dimaleate
(C) 1-[3-(10,11-dihydro-5H-dibenz[b,f]azepin-5-yl)propyl]-4-(2-pyridylmethyl)piperazine dimaleate
(D) 1-[3-(10,11-dihydro-5H-dibenz[b,f]azepin-5-yl)propyl]-4-[2-(4-pyridyl)ethyl]piperazine trimaleate
(E) 1-[3-(2-chloro-10-phenothiazinyl)propyl]-4-[2-(4-pyridyl)ethyl]piperazine trimaleate
(F) 1-[3-(2-chloro-10-phenothiazinyl)propyl]-4-(2-pyridylmethyl)piperazine dimaleate
(G) 1-[3-(2-chloro-10-phenothiazinyl)propyl]-4-(4-pyridylmethyl)piperazine trimaleate In view of various tests including those mentioned above, the compounds of the invention represented by Formula I and pharmaceutically acceptable acid addition salts thereof can be administered safely as psychotropic agents for the treatment of neuroses, mania, depression and epilepsy, in the form of a pharmaceutical preparation with a suitable and conventional carrier or adjuvant, administrable orally, without harm to the patients.

The pharmaceutical preparations can take any conventional form such as tablets, capsules or powders.

FORMULATION EXAMPLES 10 mg. tablets are prepared from the following compositions:

| | Mg. |
|---|---|
| Compound B | 10 |
| Lactose | 68 |
| Starch | 20 |
| Microcrystalline cellulose | 20 |
| Methyl cellulose | 1 |
| Magnesium stearate | 1 |
| | 120 |

25 mg. tablets are prepared from the following compositions:

| | Mg. |
|---|---|
| Compound B | 25 |
| Lactose | 53 |
| Starch | 35 |
| Microcrystalline cellulose | 35 |
| Methyl cellulose | 1 |
| Magnesium stearate | 1 |
| | 150 |

10% powders are prepared from the following compositions:

| | Percent |
|---|---|
| Compound B | 10 |
| Lactose | 70 |
| Starch | 19 |
| Methyl cellulose | 1 |
| | 100 |

The oral daily dose of Compound I or a salt thereof for human adults usually ranges from about 30 to 150 milligrams, in single or multiple dose, but it may be changed depending upon the age and/or symptoms of the patients.

The present invention will be better understood from the following examples which are illustrative and not limitative of the present invention.

Example 1

A mixture of 9 g. of 2-acetyl-10-(3-chloropropyl) phenothiazine, 6.5 g. of N-(2-thenyl)piperazine, 7 g. of potassium carbonate, 50 ml. of toluene and 50 ml. of dimethylformamide is stirred under reflux for 15 hours. After cooling, the mixture is washed three times with water. To the toluene layer is added dilute hydrochloric acid and the mixture is stirred vigorously to precipitate an oil. After removal of toluene layer, the water layer and the oil are made alkaline with dilute sodium hydroxide, and then extracted with toluene. The toluene extract is washed with water, and dried over magnesium sulfate, and then the toluene is distilled off. The remaining oil is dissolved in ethanol-chloroform (1:1) and the solution is added a solution of maleic acid in ethyl acetate. Two times recrystallization of the thus obtained crystals from 80% ethanol gives 9.5 g. of 1-[3-(2-acetyl-10-phenothiazinyl)propyl]-4-(2-thenyl)piperazine dimaleate ½ hydrate as yellow crystals melting at 179–180° C.

Example 2

Sodium amide is produced from 80 ml. of liquid ammonia, 1.07 g. of metallic sodium and 0.025 g. of iron nitrate. To this sodium amide is added in small portions 7 g. of finely divided 10,11-dihydro-5H-dibenzo[b,f]azepin. The resulting mixture is stirred for 30 minutes. The excess of liquid ammonia is removed, 100 ml. of xylene is added carefully, the whole is heated at 140° C. with stirring for 30 minutes, and then the residual liquid ammonia is distilled off completely. The remaining mixture is cooled to 60° C., and a solution of 8.3 g. of 1-(3-chloropropyl)-4-(2-pyridylmethyl)piperazine in 50 ml. of xylene is added dropwise at 60–75° C. The temperature is raised gradually to 110–120° C., and then the reaction mixture is heated at 110–120° C. with stirring for 2 hours, and further refluxed for 3 hours. After cooling, an insoluble matter is removed by filtration, the filtrate is washed with water, and the xylene is distilled off. The red-brown oil thus obtained is worked up by the procedure described in Example 1 to give 11.5 g. of 1-[3-(10,11-dihydro-5H-dibenzo[b,f]azepin - 5 - yl)propyl]-4-(2 - pyridylmethyl)-piperazine dimaleate as white needles melting at 188–190° C. (decomposition).

Example 3

To a solution of 9.5 g. of N-[3-(2-methoxy-10-phenothiazinyl)propyl]piperazine in 50 ml. of anhydrous benzene is added 5.5 g. of potassium carbonate. To the mixture is added dropwise 3.06 g. of 3-pyridylmethyl chloride with stirring and cooling. The reaction mixture is stirred at 20° C. for 12 hours, and then refluxed for 3 hours. After cooling, the potassium carbonate and benzene are removed. The residual oil is dissolved in acetone, and a solution of maleic acid in 2-propanol is added. The thus obtained crystals are recrystallized from ethanol, and then from methanol to give 12 g. of 1-[3-(2-methoxy-10-phenothiazinyl)propyl] - 4 - (3 - pyridylmethyl)piperazine dimaleate as light yellow crystals melting at 167–168° C. (decomposition).

Using the procedure set forth in the above examples, but substituting equivalent amounts of the appropriate starting materials, the following compounds are also produced:

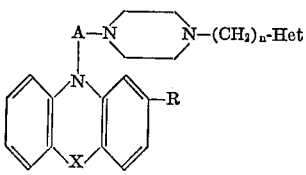

| | X | A | R | n | Het | Salt and M.P. (° C.) |
|---|---|---|---|---|---|---|
| 4 | —S— | —C—C—C— | Cl | 1 | 2-pyridyl | 2 maleate, 170–172.[1] |
| 5 | —S— | —C—C—C— | Cl | 1 | 4-pyridyl | 3 maleate, 203–205.[1] |
| 6 | —S— | —C—C—C— | CF$_3$ | 2 | 2-pyridyl | 3 maleate, 161–162.[1] |
| 7 | —S— | —C—C—C— | Cl | 1 | 2-thienyl | 2 maleate, 180–182.[1] |
| 8 | —S— | —C—C—C— | SCH$_3$ | 2 | 4-pyridyl | 3 maleate, 152–154.[1] |
| 9 | —S— | —C—C—C— | Cl | 2 | 2-pyridyl | 2 maleate, 167–168.[1] |
| 10 | —S— | —C—C—C— | Cl | 2 | 4-pyridyl | 3 maleate, 163–175.[1] |
| 11 | —S— | 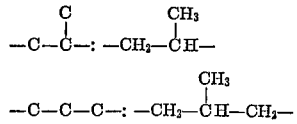 | H | 2 | 4-pyridyl | 3 maleate ½H$_2$O, 154–156.[1] |
| 12 | —CH$_2$—CH$_2$— | —C—C—C— | Cl | 1 | 2-furyl | 2 maleate, 185–187. |
| 13 | —CH$_2$—CH$_2$— | —C—C—C— | H | 1 | 2-furyl | 2 maleate, 199–202. |
| 14 | —CH$_2$—CH$_2$— | —C—C—C— | H | 1 | 2-thienyl | 2 maleate, 197–200. |
| 15 | —CH$_2$—CH$_2$— | —C—C—C— | H | 2 | 4-pyridyl | 3 maleate, 156–168.[1] |
| 16 | —CH=CH— | —C—C—C— | H | 0 | 2-pyridyl | 120–122. |
| 17 | —CH=CH— | $\begin{array}{c}\text{C}\\|\\ \text{—C—C—C—}\end{array}$ | H | 1 | 2-pyridyl | 2 maleate, 163–165. |

[1] Decomposition.

$$-\text{C}-\text{C}-\text{C}-: -\text{CH}_2-\text{CH}_2-\text{CH}_2-$$

$$\begin{array}{c}\text{C}\\|\\ -\text{C}-\text{C}-\end{array}: \begin{array}{c}\text{CH}_3\\|\\ -\text{CH}_2-\text{CH}-\end{array}$$

$$-\text{C}-\text{C}-\text{C}-: \begin{array}{c}\text{CH}_3\\|\\ -\text{CH}_2-\text{CH}-\text{CH}_2-\end{array}$$

What is claimed is:

1. An N,N-disubstituted piperazine compound of the formula:

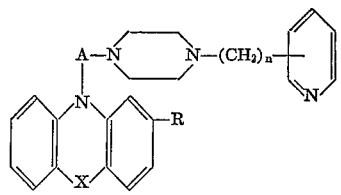

wherein X is a member selected from the group consisting of —S—, —CH$_2$—CH$_2$— and —CH=CH—; wherein R is a member selected from the group consisting of a hydrogen atom, a C$_{1-4}$ alkyl group, a methoxy group, a methylthio group, an acetyl group, a trifluoromethyl group and a halogen atom; wherein A represents a C$_{2-4}$ alkylene; and wherein n represents an integer of 0, 1, 2 or 3; and a pharmaceutically acceptable acid addition salt thereof.

2. A compound of claim 1: 1-[3-(2-methoxy-10-phenothiazinyl)propyl]-4-(3-pyridylmethyl)piperazine.

3. A compound of claim 1: 1[3-(2-chloro-10-phenothiazinyl)propyl]-4-[2-(2-pyridyl)ethyl]piperazine.

4. A compound of claim 1: 1-[3-(10,11-dihydro-5H- dibenz[b,f]azepin - 5 - yl)propyl]-4-(2 - pyridylmethyl)-piperazine.

5. A compound of claim 1: 1-[3-(10,11-dihydro-5H-dibenz[b,f]azepin - 5 - yl)propyl]-4-[2-(4-pyridyl)ethyl]-piperazine.

6. A compound of claim 1: 1-[3-(2-chloro-10-phenothiazinyl)propyl]-4-[2-(4-pyridyl)ethyl]piperazine.

7. A compound of claim 1: 1[3-(2-chloro-10-phenothiazinyl)propyl]-4-(2-pyridylmethyl)piperazine.

8. A compound of claim 1: 1-[3-(2-chloro-10-phenothiazinyl)propyl]-4-(4-pyridylmethyl)piperazine.

9. An N,N-disubstituted piperazine compound of the formula:

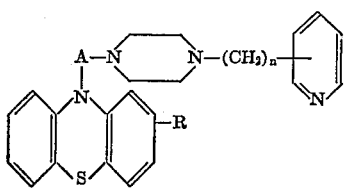

wherein R is a member selected from the group consisting of a hydrogen atom, a $C_{1-4}$ alkyl group, a methoxy group, a methylthio group, an acetyl group, a trifluoromethyl group or a halogen atom; wherein A represents a $C_{2-4}$ alkylene group; and wherein $n$ is an integer of 0, 1, 2 or 3; and a pharmaceutically acceptable acid addition salt thereof.

10. An N,N-disubstituted piperazine compound of the formula:

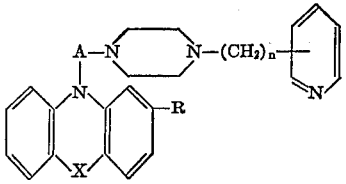

wherein X is a member selected from the group consisting of a —$CH_2$—$CH_2$— group and a —CH=CH— group; wherein R is a member selected from the group consisting of a hydrogen atom, a $C_{1-4}$ alkyl group, a methoxy group, a methylthio group, an acetyl group, a trifluoromethyl group or a halogen atom; wherein A represents a $C_{2-4}$ alkylene group; and wherein $n$ represents an integer of 0, 1, 2 or 3; and a pharmaceutically acceptable acid addition salts thereof.

References Cited
UNITED STATES PATENTS

| | | | |
|---|---|---|---|
| 3,654,270 | 4/1972 | Umemoto et al. | 260—243 |
| 3,574,204 | 4/1971 | Nakanishi et al. | 260—243 |
| 2,945,030 | 7/1960 | Gordon | 260—243 |

FOREIGN PATENTS

| | | | |
|---|---|---|---|
| 829,246 | 3/1960 | Great Britain | 260—243 |

HARRY I. MOATZ, Primary Examiner

U.S. Cl. X.R.
260—268 TR; 424—247, 250